United States Patent
Yang

(10) Patent No.: US 7,669,683 B2
(45) Date of Patent: Mar. 2, 2010

(54) ENERGY STORAGE TYPE OF DUAL-DRIVE COUPLED POWER DISTRIBUTION SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 202 days.

(21) Appl. No.: 11/950,371

(22) Filed: Dec. 4, 2007

(65) Prior Publication Data
US 2009/0143194 A1 Jun. 4, 2009

(51) Int. Cl.
*B60K 17/354* (2006.01)
(52) U.S. Cl. .............. 180/242; 180/247; 180/245; 180/65.2; 180/65.3
(58) Field of Classification Search .............. None
See application file for complete search history.

(56) References Cited

U.S. PATENT DOCUMENTS

| | | | |
|---|---|---|---|
| 6,401,854 B2* | 6/2002 | Yano et al. | 180/242 |
| 6,464,608 B2* | 10/2002 | Bowen et al. | 475/5 |
| 6,945,347 B2* | 9/2005 | Matsuno | 180/242 |
| 2001/0042649 A1* | 11/2001 | Maeda et al. | 180/65.4 |
| 2005/0284683 A1* | 12/2005 | Matsuda | 180/242 |
| 2006/0266569 A1* | 11/2006 | Fujiwara et al. | 180/65.2 |

* cited by examiner

*Primary Examiner*—Lesley Morris
*Assistant Examiner*—Marlon A Arce
(74) *Attorney, Agent, or Firm*—Rabin & Berdo, P.C.

(57) ABSTRACT

An energy storage type of dual-drive coupled power distribution system adapted to an all wheel driving (AWD) transportation means having a revolution output end from an internal combustion engine that drives front wheel through a front-wheel transmission assembly by means of an intermediate transmission and control interface or a coupling device providing gear-changing or clutching function, connects the revolving kinetics to drive the revolution input end of a dual-drive type of electromagnetic coupling drive device, and further drives the rear wheel through the other revolution output end of the dual-drive type of electromagnetic coupling drive device made in the construction of a revolving dual-end shaft with both end shafts respectively incorporated to a revolving magnetic field structure and a revolving rotor structure to regulate the power distribution between the front wheel and the rear wheel while being subject to the manipulation by a control device.

4 Claims, 2 Drawing Sheets

ENERGY STORAGE TYPE OF DUAL-DRIVE COUPLED POWER DISTRIBUTION SYSTEM

BACKGROUND OF THE INVENTION (a) Field of the Invention

The present invention is related to an energy storage type of dual-drive coupled power distribution system, and more particularly to one that provides real time power distribution for the kinetics to drive the front wheel and the rear wheel by an all wheel driving carrier for promoting drivability and drive safety under severe road and weather conditions and for operating with hybrid function.

(b) Description of the Prior Art

Conventional all wheel driving (AWD) is generally referred to four wheel driving, respectively two front wheels and two rear wheels; two front and one rear, or one front wheel and two rear wheels driving; or six-, even up to eight-wheel driving with additional rear wheels. Currently AWD is roughly classified into two systems:

(1) Full Time Driving: the engine power drives both of the front and the rear wheels in full time, and an additional differential damper such as the VW's SYNCRO is each disposed between the power source and the motive power side, as well as the power source and the rear wheel set. The advantages of this pattern include that both of the front and the rear wheels are given driving power and good driving performance while flaws including greater power loss and higher fuel consumption are observed.

(2) Real Time Driving: in this pattern, a controllable clutch subject to mechanical, electromagnetic, or fluid force is disposed between the rear wheels and the power source; when driving warrants, the clutch is closed up through the control by manual or automatic detection to drive the rear wheels, otherwise the front-drive takes over in case of general road conditions to save fuel consumption. However, this pattern, either in manual or automatic control mode, an immediate response is prevented when the road condition warrants since there is a slight delay in the timing for the rear wheels to generate kinetics.

(3) Alternatively, an intermediate differential wheel set is provided between the front and the rear wheels; however, the flaw of this pattern is that either differential output end skids, the other differential output end loses its power. That is, if the front wheel skids, the rear wheel is deprived of its power.

All those three patterns described above share the common flaw that once either wheel set skids, the other wheel set loses its power. If an additional anti-skid damper is mounted, it means more lose of power, accelerated temperature rise to the mechanical parts, and significant drop of power performance to result in:

1. In case of bumpy road condition, the rear wheels are prevented from engaging in asynchronous drive with the front wheels, for example, under circumstances when the rear wheels must run faster than the front wheel do.

2. In case of climbing a slope, or upon starting up under heavy load, controlling the rear wheels to produce power greater than that by the front wheels fails.

3. Distribution of power for the front and the rear wheels at random is impossible.

SUMMARY OF THE INVENTION

The primary purpose of the present invention is to provide an energy storage type of dual-drive coupled power distribution system to drive an all wheel driving carrier. Wherein, the revolution output end of a revolution power source drives the front-wheel transmission assembly through the output end of an intermediate transmission and control interface device, thus to drive the front wheel. Meanwhile, the output end of the intermediate transmission and control interface device drives one revolution input end of the dual-drive type of electromagnetic coupling drive device while another revolution output end of the dual-drive type of electromagnetic coupling drive device drives the rear wheel. The dual-drive type of electromagnetic coupling drive device may be in the construction of having both end capable of revolving with both end shafts respectively incorporated to a revolving magnetic field structure and a revolving rotor structure while being subject to the control device to regulate the power distribution between the front wheel and the rear wheel and to operating with hybrid function.

LISTING OF COMPONENT AND CORRESPONDING LABEL

1000: revolution power unit
1001: output end
1002, 1016, 1116, 1120: clutch
1003: intermediate transmission and control interface device
1004: dual-drive type electromagnetic coupling drive device
1006: front-wheel transmission assembly
1007: front wheel
1017: front-wheel differential wheel set
1113: rear-wheel differential wheel set
1114: rear wheel
1115: drive circuit device
1117: rechargeable device
1118: central controller
1121: brake

DETAILED DESCRIPTION OF THE PREFERRED EMBODIMENTS

An energy storage type of dual-drive coupled power distribution system of the present invention adapted to an all wheel driving (AWD) transportation means is essentially comprised of a revolution output end from an internal combustion engine (or any other revolving power source) that delivers revolving kinetics to drive front wheel through a front-wheel transmission assembly by means of an intermediate transmission and control interface device or a coupling device providing gear-changing or clutching function, connects the revolving kinetics to drive the revolution input end of a dual-drive type of electromagnetic coupling drive device, and further drives the rear wheel through the other revolution output end of the dual-drive type of electromagnetic coupling drive device. The dual-drive type of electromagnetic coupling drive device may be made in the construction of a revolving dual-end shaft with both end shafts respectively incorporated to a first revolving electro-mechanical structure and a second revolving electric machinery structure for constituting a revolving magnetic field structure and a revolving rotor structure to respectively forms the input end and the output end of the dual-drive type electromagnetic coupling drive device 1004 while being subject to the manipulation by a control device.

Figure 1:
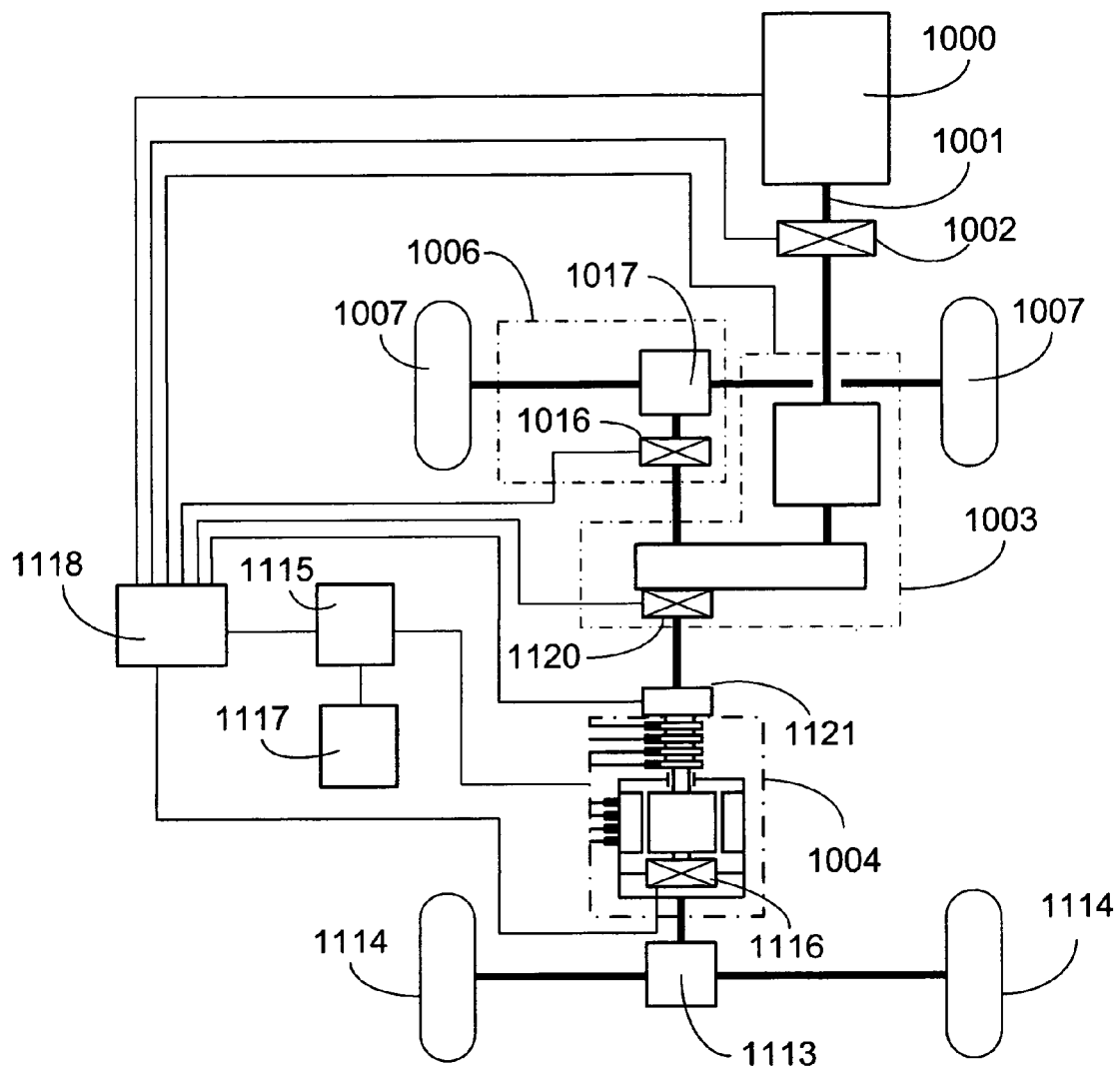
FIG. 1 is a schematic view of a preferred embodiment of the present invention.
Figure 2:
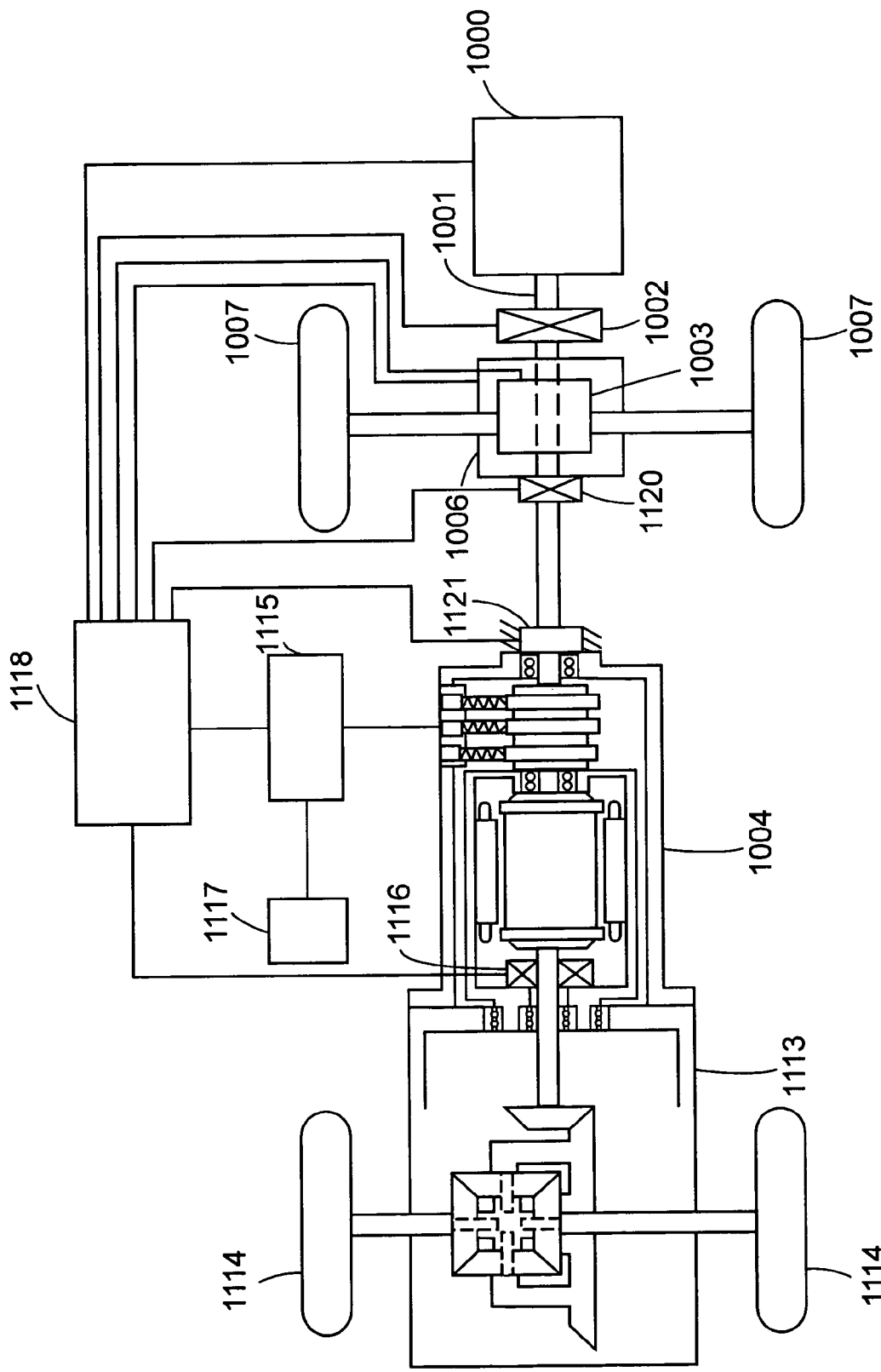
FIG. 2 is a schematic view showing a construction of a cut-away from FIG. 1 of the preferred embodiment of the present invention.

Referring to FIGS. 1, and 2 respectively for a schematic view of a preferred embodiment of the present invention and a schematic view showing a construction of a cut-away from FIG. 1, a preferred embodiment of the present invention is essentially comprised of:

a revolution power unit 1000: comprised of an internal combustion engine or other revolution power source, its revolution output shaft 1001, through an optional clutch 1002 or an intermediate transmission and control interface device 1003 that provides gearshift function, then through the front-wheel transmission assembly 1006 to drive a front wheel 1007, and through the dual-drive type of electromagnetic coupling drive device 1004 to drive the rear wheel 1114;

the clutch 1002: related to an optional clutch device driven by manual, mechanical, electromagnetic or eccentric force, or comprised of a one-way transmission; disposed at where between the revolution power unit 1000 and the intermediate transmission and control interface device 1003 and subject to the manipulation by a central controller 1118 to execute engagement or disengagement operation;

the intermediate transmission and control interface device 1003: comprised of a conventional man-machine operation interface device including an automatic transmission or manual transmission or manually controlled automatic gearshift device and a clutch; its input end receives the input of revolving kinetics from the revolution power unit 1000 and one of its output end drives a front-wheel transmission assembly 1006 to further drive a front wheel 1007;

Another output end of the intermediate transmission and control interface device 1003 is provided for driving the dual-drive type of electromagnetic coupling drive device 1004, and the output end of the dual-drive type of electromagnetic coupling drive device 1004 drives a real wheel 1114;

the front-wheel transmission assembly 1006: an optional device disposed depending on the nature of the load, including an optional front-wheel differential wheel set 1017 to drive the front wheel 1007 at both output ends, or an optional transmission wheel set to drive the single front wheel; or as required, a controllable clutch 1016 is provided to transmit or cut off the revolving kinetics delivered to the front wheel;

the clutch 1016: related to an optional clutch driven by manual, mechanical, electromagnetic, fluid, or eccentric force, or to a one-way transmission; disposed at where between the revolving kinetics output end of the intermediate transmission and control interface device 1003 and the front-wheel differential wheel set 1017 subject to the control by the central controller 1118 for executing the operation of engaging or disengaging;

the dual-drive type of electromagnetic coupling drive device 1004: related to a DC or AC, brush or brush-less revolution electro-mechanical structure to engage in dual-drive operation including a first revolving electro-mechanical structure and a second revolving electro-mechanical structure for comprising a revolving magnetic field and a revolving rotor to respectively constitute an input end and an output end of the dual-drive type electromagnetic coupling drive device 1004, and said first and second revolving electro-mechanical structure are respectively coupled to the output end of the intermediate transmission and control interface device 1003 to drive the rear wheel 1114 through a rear-wheel differential wheel set 1113 or as required, a transmission wheel set is provided to drive the single rear wheel;

the rear-wheel differential wheel set 1113: an optional rear-wheel differential wheel set disposed depending on the nature of the load, including an optional differential wheel set, or transmission wheel set to drive single rear wheel;

the clutch 1116: related to an optional clutch driven by manual, mechanical, electromagnetic, fluid, or eccentric force, or to a one-way transmission; disposed at where between a first revolving electro-mechanical structure and a second revolving electro-mechanical structure for comprising the revolving magnetic field and the revolving rotor subject to the control by the central controller 1118 for the first and second revolving electro-mechanical structures of the revolving magnetic field and the revolving rotor to engage with or disengage from the revolving rotor;

a clutch 1120: related to an optional clutch driven by manual, mechanical, electromagnetic, fluid, or eccentric force, or to a one-way transmission; disposed at where between the revolving kinetics output end of the intermediate transmission and control interface device 1003 and the an input end of the dual-drive type of electromagnetic coupling drive device 1004 subject to the control by the central controller 1118 for the intermediate transmission on and control interface device 1003 to engage with or disengage from the dual-drive type of electromagnetic coupling drive device 1004;

a brake 1121: related to an optional braking device with its braking function controllable by manual, mechanical, electromagnetic, or fluid force; disposed at where between the input end of the dual-drive type of electromagnetic coupling drive device 1004 and a static machine to execute the operation of close or release to the input end of the dual-drive type electromagnetic coupling drive device 1004 subject to the control by the central controller 1118;

a drive circuit device 1115: related to a dynamo-electric or solid status electronic device; disposed at where between the dual-drive type of electromagnetic coupling drive device 1004 and the rechargeable device 1117 to operate according to the command given by the central controller 1118 to drive the dual-drive type of electromagnetic coupling drive device 1004 to function as a motor to revolve clockwise or counter-clockwise, or to execute regulation of input or output voltage and amperage thus to control the dual-drive type of electromagnetic coupling drive device 1004 to operate as a generator for charging the rechargeable device 1117 or outputting the power to other loads while controlling the size of the amperage and voltage outputted to control the coupling torque for the dual-drive operation of the dual-drive type of electromagnetic coupling drive device 1004;

the central controller 1118: related to a dynamo-electric or solid status electronic device for outputting control commands to operate the drive circuit device 1115, the dual-drive type electromagnetic coupling drive device 1004, the revolution power unit 1000, and said each set of clutches and each set of brakes;

the rechargeable device 1117: related to a rechargeable secondary battery, capacitor, or super-capacitor;

the front wheel 1007: related to a or a plurality of wheel sets, tracks or other loads driven through the intermediate transmission and control interface device 1003 or further driven by the front-wheel transmission assembly 1006; and the rear wheel 1114: related to a or a plurality of wheel sets, tracks or other loads directly driven or driven through a transmission or a rear-wheel differential wheel set 1113.

In the energy storage type dual-drive coupled power distribution system, the structural configuration among each component is selectable as applicable and ways to construction are as follows, wherein:

ways to dispose the dual-drive type electromagnetic coupling drive device 1004 can be selected upon structural requirements as follows:
(1) The dual-drive type of electromagnetic coupling drive device 1004 is co-structured with the rear-end transmission 1113; or
(2) The dual-drive type of electromagnetic coupling drive device 1004 is co-structured with the intermediate transmission and control interface device 1003; or
(3) The dual-drive type of electromagnetic coupling drive device 1004 is independently disposed between the intermediate transmission and control interface device 1003 and the rear-wheel differential wheel set 1113.

ways to dispose the brake 1121 and the clutch 1120 can be selected upon structural requirements as follows:
(1) The brake 1121 is disposed to the dual-drive type of electromagnetic coupling drive device 1004; or
(2) The brake 1121 together with the clutch 1120 is disposed to the front-wheel transmission assembly 1006; or
(3) The brake 1121 together with the clutch 1120 is disposed to the intermediate transmission and control interface device 1003; or
(4) The clutch 1120 is disposed to the front-wheel transmission assembly 1006; or
(5) The clutch 1120 together with the brake 1121 is disposed to the dual-drive type of electromagnetic coupling drive device 1004; or
(6) The clutch 1120 is co-structured with the brake 1121; or
(7) The clutch 1120 is disposed independently; or
(8) The brake 1121 is disposed independently; or
(9) The brake 1121 and the clutch 1120 are co-structured, but are disposed independently.

ways to dispose the clutch 1002 can be selected upon structural requirements as follows:
(1) The clutch 1002 is disposed to a revolving power unit 1000; or
(2) The clutch 1002 is disposed to the front-wheel transmission assembly 1006; or
(3) The clutch 1002 is disposed to the intermediate transmission and control interface device 1003; or
(4) The clutch 1002 is independently disposed between the revolving power unit 1000 and the front-wheel transmission assembly 1006; or
(5) The clutch 1002 is independently disposed between the revolution power unit 1000 and the intermediate transmission and control interface device 1003.

Revolving kinetics outputted from the revolution power unit 1000 in the energy storage type of dual-drive coupled power distribution system of the present invention drives the front-wheel transmission assembly 1006 through the output end of the intermediate transmission and control interface device 1003 to further drive the front wheel 1007; and has another output end of the intermediate transmission and control interface device 1003 through the clutch 1120 coupled to the input end of the dual-drive type of electromagnetic coupling drive device 1004, and further through the output end of the dual-drive type of electromagnetic coupling drive device 1004 and the rear-wheel differential wheel set 1113 to drive the rear wheel 1114. The transmission between the output end of the dual-drive type of electromagnetic coupling drive device 1004 and the rear wheel 1114 includes direct transmission to the rear wheel 1114 or indirectly transmission to the real wheel 1114 through a transmission provided with gearshift or clutch function; or the rear wheel 1114 with differential need is driven through the rear-wheel differential wheel set 1113, for example the rear-wheel set on both sides, or optionally disposed a transmission wheel set to drive the single rear wheel.

The energy storage type of dual-drive coupled power distribution system of the present invention when applied in an all wheel driving carrier provides all or a part of the following functions through the operation of the intermediate transmission and control interface device 1003 and the control by the central controller 1118 to operate the clutch 1002, the clutch 1016, the clutch 1116, the clutch 1120 and the brake 1121, and to operate the dual-drive type electromagnetic coupling drive device 1004 through the drive circuit device 1115, including:
(1) when the engine operated as the revolution power unit 1000, the clutch 1002 is closed, the clutches 1016, 1116 and the brake 1121 are disengaged, and the clutch 1120 is closed, the power supplied from the rechargeable device 1117 subject to the control of the drive circuit device 1115 drives the dual-drive type of electromagnetic coupling drive device 1004 to revolve clockwise or counter-clockwise as a motor so that to drive the rear wheel 1114 by revolving together with the engine, thus regulating the power distribution of the rear wheel 1114 to facilitate the operation in various operational requirements including accelerating, climbing a slope, downgrading a slope, anti-sliding, and braking; or
(2) when the engine operated as the revolution power unit 1000, both of the clutch 1002 and 1016 are closed, the brake 1121 and the clutch 1116 is disengaged and the clutch 1120 is closed, the power supplied from the rechargeable device 1117 subject to the control of the drive circuit device 1115 drives the dual-drive type of electromagnetic coupling drive device 1004 to revolve clockwise or counter-clockwise as a motor so that to drive the front wheel 1007 and the rear wheel 1114 by revolving together with the engine, thus regulating the power distribution of the front wheel 1007 and the rear wheel 1114, and further to regulate the system operating in all wheel driving to facilitate the operation in various operational requirements including accelerating, climbing a slope, downgrading a slope, anti-sliding, and braking; or
(3) when the engine operated as the revolution power unit 1000, the clutch 1002 is closed, the clutches 1016, 1116 and the brake 1121 are disengaged, and the clutch 1120 is closed, the power supplied from the rechargeable device 1117 subject to the control of the drive circuit device 1115 drives the dual-drive type of electromagnetic coupling drive device 1004 to revolve clockwise or counter-clockwise as a motor so that to drive the rear wheel 1114 by revolving together with the engine, thus regulating the power of the rear wheel 1114 to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (4) when the engine operated as the revolution power unit 1000, both of the clutches 1002 and 1016 are closed, the brake 1121 and the clutch 1116 is disengaged and the clutch 1120 is closed, the power supplied from the rechargeable device 1117 subject to the control of the drive circuit device 1115 drives the dual-drive type of electromagnetic coupling drive device 1004 to revolve clockwise or counter-clockwise as a motor so that to drive the front wheel 1007 and the rear wheel 1114 by revolving together with the engine, thus regulating the power distribution of the front wheel 1007 and the rear wheel 1114, and further to regulate the system operating in all wheel driving to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (5) when the engine operated as the revolution power unit 1000, the clutch 1002 is closed, the clutches 1016, 1116 and the brake 1121 are disengaged and the clutch 1120 is closed, by having the first revolving electro-mechanical structure of the dual-drive type electromagnetic coupling drive device 1004 coupled to the output end of the revolving kinetics of the intermediate transmission and control interface device 1003 through the clutch 1120, and having the second revolving electro-mechanical structure of the dual-drive type electromagnetic coupling drive device 1004 coupled to the rear-wheel differential wheel set 1113 for driving the rear wheel 1114, the rpm difference is generated between the first revolving electro-mechanical structure and the second revolving electro-mechanical structure of the dual-drive type electromagnetic coupling drive device 1004 so as to generate function of a generator to charge the rechargeable device 1117 by taking advantage of the rpm difference while controlling the size of the charging amperage to further control the size of the differential coupling torque for regulating the power distribution of the rear wheel 1114; or (6) when the engine operated as the revolution power unit 1000, the clutch 1002 is closed, the clutches 1016, 1116 and the brake 1121 are disengaged and the clutch 1120 is closed, by having the first revolving electro-mechanical structure of the dual-drive type electromagnetic coupling drive device 1004 coupled to the output end of the revolving kinetics of the intermediate transmission and control interface device 1003 through the clutch 1120, and having the second revolving electro-mechanical structure of the dual-drive type electromagnetic coupling drive device 1004 coupled to the rear-wheel differential wheel set 1113 for driving the rear wheel 1114, the rpm difference is generated between the first revolving electro-mechanical structure and the second revolving electro-mechanical structure of the dual-drive type electromagnetic coupling drive device 1004, so as to generate function of a generator to charge the rechargeable device 1117 by taking advantage of the rpm difference while controlling the size of the charging amperage to further control the size of the differential coupling torque for regulating the power distribution of the rear wheel 1114 and enabling the engine being operated at the region having brake specific fuel consumption (BSFC), higher fuel efficiency and higher fuel economizing; or (7) when the engine operated as the revolution power unit 1000, the clutches 1002, 1016 and the brake 1121 are closed, and the clutches 1116 and 1120 are disengaged, the first revolving electro-mechanical structure of the dual-drive type electromagnetic coupling drive device 1004 is secured by the brake 1121 and the second revolving electro-mechanical structure of the dual-drive type electromagnetic coupling drive device 1004 is arranged to couple to the rear-wheel differential wheel set 1113, while the engine drives the front wheel 1007, the rear wheel 1114 disposed on the co-structured carrier provided with the front wheel 1007 is driven by drag, thus the rpm difference is generated between the first revolving electro-mechanical structure and the second revolving electro-mechanical structure of the dual-drive type electromagnetic coupling drive device 1004, so as to produce the function of a generator to charge the rechargeable device 1117 by taking advantage of the rpm difference while controlling the size of the charging amperage to further control the size of the differential coupling torque for regulating the power distribution of the front wheel 1007; or (8) when the engine operated as the revolution power unit 1000, the clutches 1002, 1016 and the brake 1121 are closed, and the clutches 1116 and 1120 are disengaged, the first revolving electro-mechanical structure of the dual-drive type electromagnetic coupling drive device 1004 is secured by the brake 1121 and the second revolving electro-mechanical structure of the dual-drive type electromagnetic coupling drive device 1004 is arranged to couple to the rear-wheel differential wheel set 1113, while the engine drives the front wheel 1007, the rear wheel 1114 disposed on the co-structured vehicle provided with the front wheel 1007 is driven by drag of, thus the rpm difference is generated between the first revolving electro-mechanical structure and the second revolving electro-mechanical structure of the dual-drive type electromagnetic coupling drive device 1004, so as to produce the function of a generator to charge the rechargeable device 1117 by taking advantage of the rpm difference while controlling the size of the charging amperage to further control the size of the differential coupling torque for regulating the power distribution of the front wheel 1007 and to enable the engine being operated at the region having brake specific fuel consumption (BSFC), higher fuel efficiency and higher fuel economizing; or (9) when the engine operated as the revolution power unit 1000, the clutch 1002 is closed, the clutches 1016, 1116 and the brake 1121 are disengaged and the clutch 1120 is closed, the first revolving electro-mechanical structure of the dual-drive type electromagnetic coupling drive device 1004 is coupled to the revolving kinetics output end of the intermediate transmission and control interface device 1003 and the second revolving electro-mechanical structure of the dual-drive type electromagnetic coupling drive device 1004 directly or through the rear-wheel differential wheel set 1113 drives the rear wheel 1114, and the electric power from rechargeable device 1117 subject to the control of the drive circuit device 1115 drives the dual-drive type electromagnetic coupling drive device 1004 to function as a motor and to accumulate rpm so as to assist the engine driving the rear wheel 1114; or

(10) when the engine operated as the revolution power unit 1000, the clutches 1002, 1016 are closed, the brake 1121 and the clutch 1116 are disengaged and the clutch 1120 is closed, the first revolving electro-mechanical structure of the dual-drive type electromagnetic coupling drive device 1004 is coupled to the revolving kinetics output end of the intermediate transmission and control interface device 1003 and the second revolving electromechanical structure of the dual-drive type electromagnetic coupling drive device 1004 directly or through the rear-wheel differential wheel set 1113 drives the rear wheel 1114, and the electric power from rechargeable device 1117 subject to the control of the drive circuit device 1115 drives the dual-drive type electromagnetic coupling drive device 1004 to function as a motor and to accumulate rpm so as to assist the engine driving both of the front wheel 1007 and the rear wheel 1114 and further to regulate the system executing the operation of all wheel driving; or

(11) when the engine operated as the revolution power unit 1000, the clutch 1002 is closed, the clutches 1016, 1116 and the brake 1121 are disengaged and the clutch 1120 is closed, the first revolving electro-mechanical structure of the dual-drive type electromagnetic coupling drive device 1004 is coupled to the revolving kinetics output end of the intermediate transmission and control interface device 1003 and the second revolving electro-mechanical structure of the dual-drive type electromagnetic coupling drive device 1004 directly or through the rear-wheel differential wheel set 1113 drives the rear wheel 1114, and the electric power from rechargeable device 1117 subject to the control of the drive circuit device 1115 drives the dual-drive type electromagnetic coupling drive device 1004 to function as a motor, thus to assist the engine driving the rear wheel 1114 and to enable the engine being operated at the region having brake specific fuel consumption (BSFC), higher fuel efficiency and higher fuel economizing;

(12) when the engine operated as the revolution power unit 1000, the clutches 1002, 1016 are closed, the brake 1121 and the clutch 1116 are disengaged and the clutch 1120 is closed, the first revolving electro-mechanical structure of the dual-drive type electromagnetic coupling drive device 1004 is coupled to the revolving kinetics output end of the intermediate transmission and control interface device 1003 and the second revolving electromechanical structure of the dual-drive type electromagnetic coupling drive device 1004 directly or through the rear-wheel differential wheel set 1113 drives the rear wheel 1114, and the electric power from rechargeable device 1117 subject to the control of the drive circuit device 1115 drives the dual-drive type electromagnetic coupling drive device 1004 to function as a motor, thus to assist the engine driving both of the front wheel 1007 and the rear wheel 1114 and further to regulate the system executing the operation of all wheel driving as well as to enable the engine being operated at the region having brake specific fuel consumption (BSFC), higher fuel efficiency and higher fuel economizing; or

(13) the clutch 1120 is disengaged and the brake 1121 is closed; the electric power from the rechargeable device 1117 subject to the control of the drive circuit device 1115 drives the second revolving electro-mechanical structure of the dual-drive type electromagnetic coupling drive device 1004 to separately execute clockwise or counter-clockwise revolving output to drive the rear wheel 1114; or

(14) when the engine operated as the revolution power unit 1000, both of the clutches 1002 and 1016 are closed, the clutches 1020, 1116 is disengaged and the brake 1021 is closed, the engine kinetics through the clutch 1016 drives the front wheel 1007, and the electric power from the rechargeable device 1117 subject to the control of the drive circuit device 1115 drives the dual-drive type electromagnetic coupling drive device 1004 to function as a motor, thus to drive the rear wheel 1114 and further to regulate the system to execute the operation of all wheel driving; or

(15) when the engine operated as the revolution power unit 1000, both of the clutches 1002 and 1016 are closed, the clutches 1020, 1116 is disengaged and the brake 1021 is closed, the engine kinetics through the clutch 1016 drives the front wheel 1007, and the electric power from the rechargeable device 1117 subject to the control of the drive circuit device 1115 drives the dual-drive type electromagnetic coupling drive device 1004 to function as a motor, thus to drive the rear wheel 1114 and further to regulate the system executing the operation of all wheel driving as well as to enable the engine being operated at the region having brake specific fuel consumption (BSFC), higher fuel efficiency and higher fuel economizing;

(16) when the engine operated as the revolution power unit 1000, both of the clutches 1002 and 1016 are closed, the clutches 1120, 1116 and the brake 1021 is disengaged, the revolving kinetics from the revolution power unit 1000 drives the front wheel 1007; or

(17) when the engine operated as the revolution power unit 1000, the clutch 1002 is closed, the clutch 1016 and the brake 1121 are disengaged, and the clutches 1120 and 1116 are closed, the revolving kinetics from the revolution power unit 1000 drives the rear wheel 1114; or

(18) when the engine operated as the revolution power unit 1000, the clutches 1002 and 1016 are closed, the brake 1121 is disengaged, and the clutches 1120 and 1116 are closed, the revolving kinetics from the revolution power unit 1000 drives both the rear wheel 1114 and the front wheel 1007, thus further to regulate the system executing the operation of all wheel driving; or

(19) when the engine operated as the revolution power unit 1000, the clutch 1002 is closed or disengaged, the clutches 1016, 1120, 1116 are disengaged, and the brake 1121 is closed, in the event of driving down a slope, executing a brake, or an deceleration brake, the dual-drive type electromagnetic coupling drive device 1004 functions as a generator to charge the rechargeable device 1117 or supply the power to other electrical driven load for executing a brake with regenerated power; or

(20) when the engine operated as the revolution power unit 1000, the clutches 1002 and 1016 are closed, the clutches 1120 and 1116 are disengaged and the brake 1121 is in a closed braking status, in the event of driving down a slope, executing a brake, or an deceleration brake, the dual-drive type electromagnetic coupling drive device 1004 functions as a generator to charge the rechargeable device 1117 or supply the power to other electrical driven load for executing a brake with regenerated power to jointly execute the function of a brake with the damper of the engine; or

(21) when the engine operated as the revolution power unit 1000, the clutches 1002, 1016, 1120, 1116 are closed, and the brake 1121 is disengaged, in the event of driving down a slope, executing a brake, or an deceleration brake, the damper of the engine operates as the function of a brake.

The energy storage type dual-drive coupled power distribution system can further construct the rpm ratio from the revolution power unit 1000 respectively delivered to the front wheel 1007 and the rear wheel 1114 in various layouts of different rpm ratio. In the course of 4WD or all wheel driving or in the event of sliding, if the clutch 1116 is neither closed nor disposed, when being driven, the rpm between the first revolving electro-mechanical structure and the second revolving electro-mechanical structure of the dual-drive type electromagnetic coupling drive device 1004 are different, including:

the rpm of the first revolving electro-mechanical structure is faster than that of the second revolving electro-mechanical structure; or the rpm of the second revolving electro-mechanical structure is faster than that of the first revolving electro-mechanical structure;

at driven as above, the rpm difference between different rpm of the first revolving electro-mechanical structure and the second revolving electro-mechanical structure of the dual-drive type electromagnetic coupling drive device 1004 serves as the function of a generator to charge the rechargeable device 1117 or to supply power to other loads, and further enables the engine being operated at the region having brake specific fuel consumption (BSFC), higher fuel efficiency and higher fuel economizing;

In practical application, the energy storage type of dual-drive coupled power distribution system of the present invention drives both the front and the rear wheel sets at the same time, or may only drive the front wheel set or the rear wheel set. Wherein:

the front wheel set includes one or a plurality of circular wheels, or any revolving wheel in a given geometric shape;

the rear wheel set includes one or a plurality of circular wheels, or any revolving wheel in a given geometric shape; and said wheel set described above includes a track structure.

Within the system of the present invention, clutches 1002, 1016, 1116 and 1120, and the brake 1121 are all optional devices and the operating functions of the system are relatively increased or decreased. The inference of the increased or decreased functions is well known to those who are familiar with the art of the AWD, and thus will not be elaborated herein.

In conclusion, the energy storage type of dual-drive coupled power distribution system of the present invention may be applied in a vehicle, sea vessel or any other AWD carrier with fixed type of compound drive power. In practical applications, peripherals for the output may be selected as applicable to give more flexibility in choosing the system required.

The invention claimed is:

1. An energy storage type of dual-drive coupled power distribution system of the present invention adapted to an all wheel driving (AWD) transportation means is essentially comprised of a revolution output end from revolving power source that delivers revolving kinetics to drive front wheel through a front-wheel transmission assembly by means of an intermediate transmission and control interface device or a coupling device providing gear-changing or clutching function, and connects the revolving kinetics to drive the revolution input end of a dual-drive type of electromagnetic coupling drive device, and further drives a rear wheel through the other revolution output end of the dual-drive type of electromagnetic coupling drive device; the dual-drive type of electromagnetic coupling drive device may be made in the construction of a revolving dual-end shaft with both end shafts respectively incorporated to a first revolving electro-mechanical structure and a second revolving electric machinery structure for constituting a revolving magnetic field structure and a revolving rotor structure to respectively forms the input end and the output end of the dual-drive type electromagnetic coupling drive device (1004) while being subject to the manipulation by a control device and to regulate the power distribution of the front wheel and the rear wheel, wherein it is essentially comprised of:

a revolution power unit (1000): comprised of an internal combustion engine or other revolution power source, driving a revolution output shaft (1001), through an clutch (1002) or an intermediate transmission and control interface device (1003) that provides gearshift function, then through the front-wheel transmission assembly (1006) to drive a front wheel (1007), and through the dual-drive type of electromagnetic coupling drive device (1004) to drive the rear wheel (1114);

the clutch (1002): related to an clutch device driven by manual, mechanical, electromagnetic or eccentric force, or comprised of a one-way transmission; disposed at where between the revolution power unit (1000) and the intermediate transmission and control interface device (1003) and subject to the manipulation by a central controller (1118) to execute engagement or disengagement operation;

the intermediate transmission and control interface device (1003): comprised of a conventional operation interface device including an automatic transmission or manual transmission or manually controlled automatic gearshift device and a clutch; its input end receives the input of revolving kinetics from the revolution power unit (1000) and one of its output end drives a front-wheel transmission assembly (1006) to further drive a front wheel (1007);

Another output end of the intermediate transmission and control interface device (1003) is provided for driving the dual-drive type of electromagnetic coupling drive device (1004), and the output end of the dual-drive type of electromagnetic coupling drive device (1004) drives a real wheel (1114);

the front-wheel transmission assembly (1006): an device disposed depending on the nature of the load, including an front-wheel differential wheel set (1017) to drive the front wheel (1007) at both output ends, or an transmission wheel set to drive the single front wheel; or as required, a controllable clutch (1016) is provided to transmit or cut off the revolving kinetics delivered to the front wheel;

the clutch (1016): related to an clutch driven by manual, mechanical, electromagnetic, fluid, or eccentric force, or to a one-way transmission; disposed at where between the revolving kinetics output end of the intermediate transmission and control interface device (1003) and the front-wheel differential wheel set (1017) subject to the control by the central controller (1118) for executing the operation of engaging or disengaging;

the dual-drive type of electromagnetic coupling drive device (1004): related to a DC or AC, brush or brush-less revolution electro-mechanical structure to engage in dual-drive operation including a first revolving electro-mechanical structure and a second revolving electro-mechanical structure for comprising a revolving magnetic field and a revolving rotor to respectively constitute an input end and an output end of the dual-drive type electromagnetic coupling drive device (1004), and said first and second revolving electro-mechanical structure are respectively coupled to the output end of the intermediate transmission and control interface device (1003) to drive the rear wheel (1114) through a rear-wheel differential wheel set (1113) or as required, a transmission wheel set is provided to drive the single rear wheel;

the rear-wheel differential wheel set (1113): an rear-wheel differential wheel set disposed depending on the nature of the load, including an differential wheel set, or transmission wheel set to drive single rear wheel;

the clutch (1116): related to an clutch driven by manual, mechanical, electromagnetic, fluid, or eccentric force, or to a one-way transmission; disposed at where between a first revolving electro-mechanical structure and a second revolving electro-mechanical structure for comprising the revolving magnetic field and the revolving rotor subject to the control by the central controller (1118) for the first and second revolving electro-mechanical structures of the revolving magnetic field and the revolving rotor to engage with or disengage from the revolving rotor;

a clutch (1120): related to an clutch driven by manual, mechanical, electromagnetic, fluid, or eccentric force, or to a one-way transmission; disposed at where between the revolving kinetics output end of the intermediate transmission and control interface device (1003) and the an input end of the dual-drive type of electromagnetic coupling drive device (1004) subject to the control by the central controller (1118) for the intermediate transmission on and control interface device (1003) to engage with or disengage from the dual-drive type of electromagnetic coupling drive device (1004);

a brake (1121): related to an braking device with its braking function controllable by manual, mechanical, electromagnetic, or fluid force; disposed at where between the input end of the dual-drive type of electromagnetic coupling drive device (1004) and a static machine to execute the operation of close or release to the input end of the dual-drive type electromagnetic coupling drive device (1004) subject to the control by the central controller (1118);

a drive circuit device (1115): related to a dynamo-electric or solid status electronic device; disposed at where between the dual-drive type of electromagnetic coupling drive device (1004) and the rechargeable device (1117) to operate according to the command given by the central controller (1118) to drive the dual-drive type of electromagnetic coupling drive device (1004) to function as a motor to revolve clockwise or counter-clockwise, or to execute regulation of input or output voltage and amperage thus to control the dual-drive type of electromagnetic coupling drive device (1004) to operate as a generator for charging the rechargeable device (1117) or outputting the power to other loads while controlling the size of the amperage and voltage outputted to control the coupling torque for the dual-drive operation of the dual-drive type of electromagnetic coupling drive device (1004);

the central controller (1118): related to a dynamo-electric or solid status electronic device for outputting control commands to operate the drive circuit device (1115), the dual-drive type electromagnetic coupling drive device (1004), the revolution power unit (1000), and said each set of clutches and each set of brakes;

the rechargeable device (1117): related to a rechargeable secondary battery, capacitor, or super-capacitor;

the front wheel (1007): related to a or a plurality of wheel sets, tracks or other loads driven through the intermediate transmission and control interface device (1003) or further driven by the front-wheel transmission assembly (1006); and the rear wheel (1114): related to a or a plurality of wheel sets, tracks or other loads directly driven or driven through a transmission or a rear-wheel differential wheel set (1113);

In the energy storage type dual-drive coupled power distribution system, the structural configuration among each component is selectable as applicable and ways to construction are as follows, wherein:

ways to dispose the dual-drive type electromagnetic coupling drive device (1004) can be selected upon structural requirements as follows:

(1) The dual-drive type of electromagnetic coupling drive device (1004) is co-structured with the rear-end transmission (1113); or (2) The dual-drive type of electromagnetic coupling drive device (1004) is co-structured with the intermediate transmission and control interface device (1003); or (3) The dual-drive type of electromagnetic coupling drive device (1004) is independently disposed between the intermediate transmission and control interface device (1003) and the rear-wheel differential wheel set (1113);

ways to dispose the brake (1121) and the clutch (1120) can be selected upon structural requirements as follows:

(1) The brake (1121) is disposed to the dual-drive type of electromagnetic coupling drive device (1004); or (2) The brake (1121) together with the clutch (1120) is disposed to the front-wheel transmission assembly (1006); or (3) The brake (1121) together with the clutch (1120) is disposed to the intermediate transmission and control interface device (1003); or (4) The clutch (1120) is disposed to the front-wheel transmission assembly (1006); or (5) The clutch (1120) together with the brake (1121) is disposed to the dual-drive type of electromagnetic coupling drive device (1004); or (6) The clutch (1120) is co-structured with the brake (1121); or (7) The clutch (1120) is disposed independently; or (8) The brake (1121) is disposed independently; or (9) The brake (1121) and the clutch (1120) are co-structured, but are disposed independently;

ways to dispose the clutch (1002) can be selected upon structural requirements as follows:

(1) The clutch (1002) is disposed to a revolving power unit (1000); or (2) The clutch (1002) is disposed to the front-wheel transmission assembly (1006); or (3) The clutch (1002) is disposed to the intermediate transmission and control interface device (1003); or (4) The clutch (1002) is independently disposed between the revolving power unit (1000) and the front-wheel transmission assembly (1006); or (5) The clutch (1002) is independently disposed between the revolution power unit (1000) and the intermediate transmission and control interface device (1003).

2. An energy storage type of dual-drive coupled power distribution system as claimed in claim 1, wherein the revolving kinetics outputted from the revolution power unit (1000) drives the front-wheel transmission assembly (1006) through the output end of the intermediate transmission and control interface device (1003) to further drive the front wheel (1007); and has another output end of the intermediate transmission and control interface device (1003) through the clutch (1120) coupled to the input end of the dual-drive type of electromagnetic coupling drive device (1004), and further through the output end of the dual-drive type of electromagnetic coupling drive device (1004) and the rear-wheel differential wheel set (1113) to drive the rear wheel (1114); The transmission between the output end of the dual-drive type of electromagnetic coupling drive device (1004) and the rear wheel (1114) includes direct transmission to the rear wheel (1114) or indirectly transmission to the real wheel (1114) through a transmission provided with gearshift or clutch function; or the rear wheel (1114) with differential need is driven through the rear-wheel differential wheel set (1113), for example the rear-wheel set on both sides, or disposed a transmission wheel set to drive the single rear wheel;

The energy storage type of dual-drive coupled power distribution system of the present invention when applied in an all wheel driving carrier provides all or a part of the following functions through the operation of the intermediate transmission and control interface device (1003) and the control by the central controller (1118) to operate the clutch (1002), the clutch (1016), the clutch (1116), the clutch (1120) and the brake (1121), and operate the dual-drive type electromagnetic coupling drive device (1004) through the drive circuit device (1115), including:

(1) when the engine operated as the revolution power unit (1000), the clutch (1002) is closed, the clutches (1016), (1116) and the brake (1121) are disengaged, and the clutch (1120) is closed, the power supplied from the rechargeable device (1117) subject to the control of the drive circuit device (1115) drives the dual-drive type of electromagnetic coupling drive device (1004) to revolve clockwise or counter-clockwise as a motor so that to drive the rear wheel (1114) by revolving together with the engine, thus regulating the power distribution of the rear wheel (1114) to facilitate the operation in various operational requirements including accelerating, climbing a slope, downgrading a slope, anti-sliding, and braking; or (2) when the engine operated as the revolution power unit (1000), both of the clutches (1002) and (1016) are closed, the brake (1121) and the clutch (1116) is disengaged and the clutch (1120) is closed, the power supplied from the rechargeable device (1117) subject to the control of the drive circuit device (1115) drives the dual-drive type of electromagnetic coupling drive device (1004) to revolve clockwise or counter-clockwise as a motor so that to drive the front wheel (1007) and the rear wheel (1114) by revolving together with the engine, thus regulating the power distribution of the front wheel (1007) and the rear wheel (1114), and further to regulate the system operating in all wheel driving to facilitate the operation in various operational requirements including accelerating, climbing a slope, downgrading a slope, anti-sliding, and braking; or (3) when the engine operated as the revolution power unit (1000), the clutch (1002) is closed, the clutches (1016), (1116) and the brake (1121) are disengaged, and the clutch (1120) is closed, the power supplied from the rechargeable device (1117) subject to the control of the drive circuit device (1115) drives the dual-drive type of electromagnetic coupling drive device (1004) to revolve clockwise or counter-clockwise as a motor so that to drive the rear wheel (1114) by revolving together with the engine, thus regulating the power of the rear wheel (1114) to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (4) when the engine operated as the revolution power unit (1000), both of the clutches (1002) and (1016) are closed, the brake (1121) and the clutch (1116) is disengaged and the clutch (1120) is closed, the power supplied from the rechargeable device (1117) subject to the control of the drive circuit device (1115) drives the dual-drive type of electromagnetic coupling drive device (1004) to revolve clockwise or counter-clockwise as a motor so that to drive the front wheel (1007) and the rear wheel (1114) by revolving together with the engine, thus regulating the power distribution of the front wheel (1007) and the rear wheel (1114), and further to regulate the system operating in all wheel driving to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (5) when the engine operated as the revolution power unit (1000), the clutch (1002) is closed, the clutches (1016), (1116) and the brake (1121) are disengaged and the clutch (1120) is closed, by having the first revolving electro-mechanical structure of the dual-drive type electromagnetic coupling drive device (1004) coupled to the output end of the revolving kinetics of the intermediate transmission and control interface device (1003) through the clutch (1120), and having the second revolving electro-mechanical structure of the dual-drive type electromagnetic coupling drive device (1004) coupled to the rear-wheel differential wheel set (1113) for driving the rear wheel (1114), the rpm difference is generated between the first revolving electro-mechanical structure and the second revolving electro-mechanical structure of the dual-drive type electromagnetic coupling drive device (1004) SO as to generate function of a generator to charge the rechargeable device (1117) by taking advantage of the rpm difference while controlling the size of the charging amperage to further control the size of the differential coupling torque for regulating the power distribution of the rear wheel (1114); or (6) when the engine operated as the revolution power unit (1000), the clutch (1002) is closed, the clutches (1016), (1116) and the brake (1121) are disengaged and the clutch (1120) is closed, by having the first revolving electro-mechanical structure of the dual-drive type electromagnetic coupling drive device (1004) coupled to the output end of the revolving kinetics of the intermediate transmission and control interface device (1003) through the clutch (1120), and having the second revolving electro-mechanical structure of the dual-drive type electromagnetic coupling drive device (1004) coupled to the rear-wheel differential wheel set (1113) for driving the rear wheel (1114), the rpm difference is generated between the first revolving electro-mechanical structure and the second revolving electro-mechanical structure of the dual-drive type electromagnetic coupling drive device (1004), so as to generate function of a generator to charge the rechargeable device (1117) by taking advantage of the rpm difference while controlling the size of the charging amperage to further control the size of the differential coupling torque for regulating the power distribution of the rear wheel (1114) and enabling the engine being operated at the region having brake specific fuel consumption (BSFC), higher fuel efficiency and higher fuel economizing; or (7) when the engine operated as the revolution power unit (1000), the clutches (1002), (1016) and the brake (1121) are closed, and the clutches (1116) and (1120) are disengaged, the first revolving electro-mechanical structure of the dual-drive type electromagnetic coupling drive device 1004 is secured by the brake (1121) and the second revolving electro-mechanical structure of the dual-drive type electromagnetic coupling drive device (1004) is arranged to couple to the rear-wheel differential wheel set (1113), while the engine drives the front wheel (1007), the rear wheel (1114) disposed on the co-structured carrier provided with the front wheel (1007) is driven by drag, thus the rpm difference is generated between the first revolving electro-mechanical structure and the second revolving electro-mechanical structure of the dual-drive type electromagnetic coupling drive device (1004), so as to produce the function of a generator to charge the rechargeable device (1117) by taking advantage of the rpm difference while controlling the size of the charging amperage to further control the size of the differential coupling torque for regulating the power distribution of the front wheel (1007); or (8) when the engine operated as the revolution power unit (1000), the clutches (1002), (1016) and the brake (1121) are closed, and the clutches (1116) and (1120) are disengaged, the first revolving electro-mechanical structure of the dual-drive type electromagnetic coupling drive device (1004) is secured by the brake (1121) and the second revolving electro-mechanical structure of the dual-drive type electromagnetic coupling drive device (1004) is arranged to couple to the rear-wheel differential wheel set (1113), while the engine drives the front wheel (1007), the rear wheel (1114) disposed on the co-structured vehicle provided with the front wheel (1007) is driven by drag of, thus the rpm difference is generated between the first revolving electro-mechanical structure and the second revolving electro-mechanical structure of the dual-drive type electromagnetic coupling drive device (1004), 50 as to produce the function of a generator to charge the rechargeable device (1117) by taking advantage of the rpm difference while controlling the size of the charging amperage to further control the size of the differential coupling torque for regulating the power distribution of the front wheel (1007) and to enable the engine being operated at the region having brake specific fuel consumption (BSFC), higher fuel efficiency and higher fuel economizing; or (9) when the engine operated as the revolution power unit (1000), the clutch (1002) is closed, the clutches (1016), (1116) and the brake (1121) are disengaged and the clutch (1120) is closed, the first revolving electro-mechanical structure of the dual-drive type electromagnetic coupling drive device (1004) is coupled to the revolving kinetics output end of the intermediate transmission and control interface device (1003) and the second revolving electro-mechanical structure of the dual-drive type electromagnetic coupling drive device (1004) directly or through the rear-wheel differential wheel set (1113) drives the rear wheel (1114), and the electric power from rechargeable device (1117) subject to the control of the drive circuit device (1115) drives the dual-drive type electromagnetic coupling drive device (1004) to function as a motor and to accumulate rpm so as to assist the engine driving the rear wheel (1114); or

(10) when the engine operated as the revolution power unit (1000), the clutches (1002), (1016) are closed, the brake (1121) and the clutch (1116) are disengaged and the clutch (1120) is closed, the first revolving electro-mechanical structure of the dual-drive type electromagnetic coupling drive device (1004) is coupled to the revolving kinetics output end of the intermediate transmission and control interface device (1003) and the second revolving electro-mechanical structure of the dual-drive type electromagnetic coupling drive device (1004) directly or through the rear-wheel differential wheel set (1113) drives the rear wheel (1114), and the electric power from rechargeable device (1117) subject to the control of the drive circuit device (1115) drives the dual-drive type electromagnetic coupling drive device (1004) to function as a motor and to accumulate rpm so as to assist the engine driving both of the front wheel (1007) and the rear wheel (1114) and further to regulate the system executing the operation of all wheel driving; or

(11) when the engine operated as the revolution power unit (1000), the clutch (1002) is closed, the clutches (1016), (1116) and the brake (1121) are disengaged and the clutch (1120) is closed, the first revolving electro-mechanical structure of the dual-drive type electromagnetic coupling drive device (1004) is coupled to the revolving kinetics output end of the intermediate transmission and control interface device (1003) and the second revolving electro-mechanical structure of the dual-drive type electromagnetic coupling drive device (1004) directly or through the rear-wheel differential wheel set (1113) drives the rear wheel (1114), and the electric power from rechargeable device (1117) subject to the control of the drive circuit device (1115) drives the dual-drive type electromagnetic coupling drive device (1004) to function as a motor, thus to assist the engine driving the rear wheel (1114) and to enable the engine being operated at the region having brake specific fuel consumption (BSFC), higher fuel efficiency and higher fuel economizing;

(12) when the engine operated as the revolution power unit (1000), the clutches (1002), (1016) are closed, the brake (1121) and the clutch (1116) are disengaged and the clutch (1120) is closed, the first revolving electro-mechanical structure of the dual-drive type electromagnetic coupling drive device (1004) is coupled to the revolving kinetics output end of the intermediate transmission and control interface device (1003) and the second revolving electro-mechanical structure of the dual-drive type electromagnetic coupling drive device (1004) directly or through the rear-wheel differential wheel set (1113) drives the rear wheel (1114), and the electric power from rechargeable device (1117) subject to the control of the drive circuit device (1115) drives the dual-drive type electromagnetic coupling drive device (1004) to function as a motor, thus to assist the engine driving both of the front wheel (1007) and the rear wheel (1114) and further to regulate the system executing the operation of all wheel driving as well as to enable the engine being operated at the region having brake specific fuel consumption (BSFC), higher fuel efficiency and higher fuel economizing; or

(13) the clutch (1120) is disengaged and the brake (1121) is closed; the electric power from the rechargeable device (1117) subject to the control of the drive circuit device (1115) drives the second revolving electro-mechanical structure of the dual-drive type electromagnetic coupling drive device (1004) to separately execute clockwise or counter-clockwise revolving output to drive the rear wheel (1114); or

(14) when the engine operated as the revolution power unit (1000), both of the clutches (1002) and (1016) are closed, the clutches (1020), (1116) is disengaged and the brake (1021) is closed, the engine kinetics through the clutch (1016) drives the front wheel (1007), and the electric power from the rechargeable device (1117) subject to the control of the drive circuit device (1115) drives the dual-drive type electromagnetic coupling drive device (1004) to function as a motor, thus to drive the rear wheel (1114) and further to regulate the system to execute the operation of all wheel driving; or

(15) when the engine operated as the revolution power unit (1000), both of the clutches (1002) and (1016) are closed, the clutches (1020), (1116) is disengaged and the brake (1021) is closed, the engine kinetics through the clutch (1016) drives the front wheel (1007), and the electric power from the rechargeable device (1117) subject to the control of the drive circuit device (1115) drives the dual-drive type electromagnetic coupling drive device (1004) to function as a motor, thus to drive the rear wheel (1114) and further to regulate the system executing the operation of all wheel driving as well as to enable the engine being operated at the region having brake specific fuel consumption (BSFC), higher fuel efficiency and higher fuel economizing;

(16) when the engine operated as the revolution power unit (1000), both of the clutches (1002) and (1016) are closed, the clutches (1120), (1116) and the brake (1021) is disengaged, the revolving kinetics from the revolution power unit (1000) drives the front wheel (1007); or

(17) when the engine operated as the revolution power unit (1000), the clutch (1002) is closed, the clutch (1016) and the brake (1121) are disengaged, and the clutches (1120) and (1116) are closed, the revolving kinetics from the revolution power unit (1000) drives the rear wheel (1114); or

(18) when the engine operated as the revolution power unit (1000), the clutches (1002) and (1016) are closed, the brake (1121) is disengaged, and the clutches (1120) and (1116) are closed, the revolving kinetics from the revolution power unit (1000) drives both the rear wheel (1114) and the front wheel (1007), thus further to regulate the system executing the operation of all wheel driving; or

(19) when the engine operated as the revolution power unit (1000), the clutch (1002) is closed or disengaged, the clutches (1016), (1120), (1116) are disengaged, and the brake (1121) is closed, in the event of driving down a slope, executing a brake, or an deceleration brake, the dual-drive type electromagnetic coupling drive device (1004) functions as a generator to charge the rechargeable device (1117) or supply the power to other electrical driven load for executing a brake with regenerated power; or

(20) when the engine operated as the revolution power unit (1000), the clutches (1002) and (1016) are closed, the clutches (1120) and (1116) are disengaged and the brake (1121) is in a closed braking status, in the event of driving down a slope, executing a brake, or an deceleration brake, the dual-drive type electromagnetic coupling drive device (1004) functions as a generator to charge the rechargeable device (1117) or supply the power to other electrical driven load for executing a brake with regenerated power to jointly execute the function of a brake with the damper of the engine; or

(21) when the engine operated as the revolution power unit (1000), the clutches (1002), (1016), (1120), (1116) are closed, and the brake (1121) is disengaged, in the event of driving down a slope, executing a brake, or an deceleration brake, the damper of the engine operates as the function of a brake.

3. An energy storage type of dual-drive coupled power distribution system as claimed in claim 1 is further construct the rpm ratios respectively transmitted from the revolution power unit (1000) to the front wheel (1007) and the rear wheel (1114) in various layouts of different rpm ratios; in the course of all wheel driving or in the event of sliding, if the clutch (1116) is neither closed nor disposed, when being driven, the rpm between the first revolving electro-mechanical structure and the second revolving electro-mechanical structure of the dual-drive type electromagnetic coupling drive device (1004) are different, including:

the rpm of the first revolving electro-mechanical structure is faster than that of the second revolving electro-mechanical structure; or the rpm of the second revolving electro-mechanical structure is faster than that of the first revolving electro-mechanical structure;

at driven as above, the rpm difference between different rpm of the first revolving electro-mechanical structure and the second revolving electro-mechanical structure of the dual-drive type electromagnetic coupling drive device (1004) serves as the function of a generator to charge the rechargeable device (1117) or to supply power to other loads, and further enables the engine being operated at the region having brake specific fuel consumption (BSFC), higher fuel efficiency and higher fuel economizing.

4. An energy storage type of dual-drive coupled power distribution system as claimed in claim 1, when in practical application, drives both the front and the rear wheel sets at the same time, or may only drive the front wheel set or the rear wheel set; wherein:

the front wheel set includes one or a plurality of circular wheels, or any revolving wheel in a given geometric shape;

the rear wheel set includes one or a plurality of circular wheels, or any revolving wheel in a given geometric shape; and said wheel set described above includes a track structure.

* * * * *